United States Patent [19]

Kubota et al.

[11] Patent Number: 5,329,240

[45] Date of Patent: Jul. 12, 1994

[54] APPARATUS FOR MEASURING CLOCK PULSE DELAY IN ONE OR MORE CIRCUITS

[75] Inventors: Katsuhisa Kubota, Kawasaki; Kunitoshi Yamamoto, Yokohama; Kazuharu Nakano, Kawasaki, all of Japan

[73] Assignee: Fujitsu Limited, Japan

[21] Appl. No.: 64,948

[22] Filed: May 20, 1993

Related U.S. Application Data

[63] Continuation of Ser. No. 778,798, Oct. 17, 1991, abandoned.

[30] Foreign Application Priority Data

Oct. 20, 1990 [JP] Japan .................................. 2-282621

[51] Int. Cl.$^5$ ............................................. H03K 5/13
[52] U.S. Cl. ..................................... 328/155; 307/603; 328/55; 324/617
[58] Field of Search ...................... 368/107; 324/76.79, 324/617; 328/155, 55, 66; 307/603, 606, 602, 595, 597

[56] References Cited

U.S. PATENT DOCUMENTS

| | | |
|---|---|---|
| 4,494,021 | 1/1985 | Bell et al. |
| 4,504,749 | 3/1985 | Yoshida. |
| 4,623,805 | 11/1986 | Flora et al. |
| 4,641,048 | 2/1987 | Pollock. |
| 4,845,390 | 7/1989 | Chan. |
| 4,859,954 | 8/1989 | Yoshimura ........................... 328/155 |
| 4,899,071 | 2/1990 | Morales. |
| 5,046,075 | 9/1991 | Kraemer ............................. 328/155 |
| 5,087,829 | 2/1992 | Ishibashi ............................ 328/155 |
| 5,087,842 | 2/1992 | Pulsipher et al. |
| 5,122,679 | 6/1992 | Ishii .................................... 328/155 |
| 5,148,113 | 9/1992 | Wight ................................. 328/155 |

FOREIGN PATENT DOCUMENTS

| | | |
|---|---|---|
| 55-83913 | 6/1980 | Japan. |
| 59-144927 | 8/1984 | Japan. |
| 64-58007 | 3/1989 | Japan. |
| 2213242 | 8/1990 | Japan. |

Primary Examiner—Kenneth A. Wieder
Assistant Examiner—Jose M. Solis
Attorney, Agent, or Firm—Welsh & Katz, Ltd.

[57] ABSTRACT

A clock adjustment system for economically adjusting the output phases of a printed circuit board and an IC comprises a gate circuit for connecting an input of a measured circuit to an output. By turning the gate circuit on and by observing the oscillation of a measured circuit, the phase of the measured circuit is adjusted.

8 Claims, 10 Drawing Sheets

APPARATUS FOR MEASURING CLOCK PULSE DELAY IN ONE OR MORE CIRCUITS

This is a continuation of application Ser. No. 07/778,798, filed Oct. 17, 1991, now abandoned.

BACKGROUND OF THE INVENTION

This invention pertains to a clock adjustment circuit for an LSI and a printed circuit board, and more particularly to a clock adjustment system for obtaining a phase delay of a measured circuit from an oscillating frequency.

DESCRIPTION OF THE RELATED ART

A pulse generator and an oscilloscope have been used for measuring the delay of an input pulse of a circuit having a form such as an integrated circuit or one on a printed circuit board.

Figure 1:
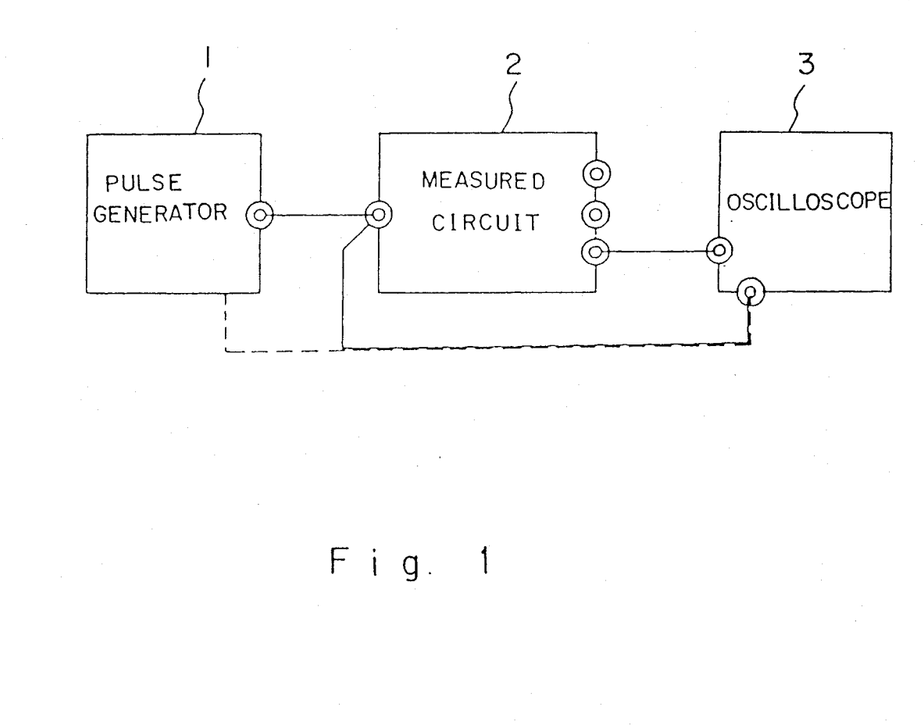
FIG. 1 is a block diagram of a conventional measuring system.

FIG. 1 is a block diagram of a conventional measuring system.

A pulse generator 1 generates a pulse and supplies the pulse to a measured circuit 2. An oscilloscope 3 receives an output for the signal generated by the measured circuit 2, thereby measuring the phase delay from the pulse generator 1. The oscilloscope 3 enables a waveform of the pulse-generator and a waveform of the measured circuit to be measured in a time series, thereby allowing the time delay of a pulse outputted from the measured circuit 2 to be read at a glance.

The conventional system described above has an advantage in that it allows an oscilloscope to directly measure the time difference between two pulses in a time series. However, since an error in reading an oscilloscope determines the accuracy, it has been necessary to have an oscilloscope and a pulse generator of a high performance, for raising the system accuracy. Also, the maintenance of respective apparatuses has been cumbersome to keep the system accuracy.

SUMMARY OF THE INVENTION

This invention aims at providing a clock adjustment system for creating a delay of an IC and a measured circuit from a reasonably priced apparatus.

It configures a clock adjustment system, which is a clock pulse forming circuit, whose output is connected to an input of a measured circuit and whose input is connected to an output of the measured circuit; in which the input and output of the clock pulse forming circuit are connected through a gate circuit, and an oscillation generated when the gate circuit is turned on is used for measuring a delay of the measured circuit.

DESCRIPTION OF THE PREFERRED EMBODIMENTS

This invention is explained in detail by referring to attached drawings.

Figure 2:
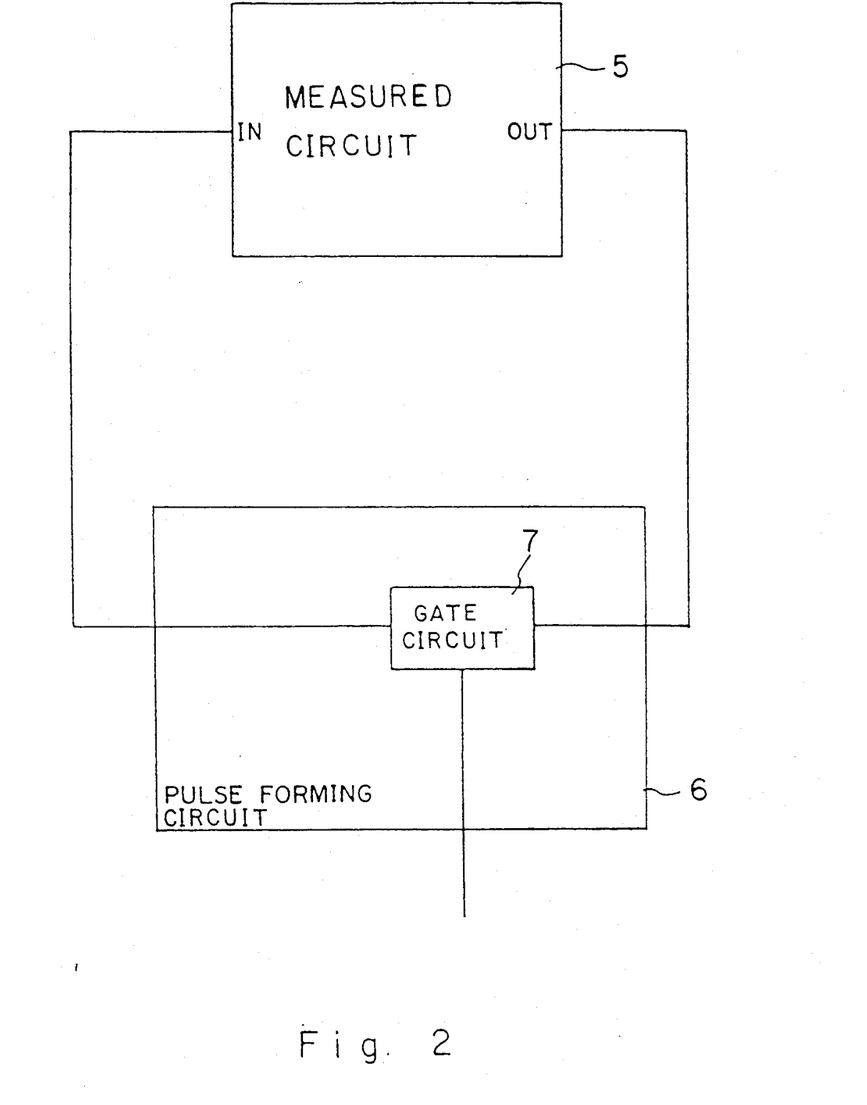
FIG. 2 is a block diagram designating a principle of this invention.

FIG. 2 is a block diagram designating a principle of this invention.

This invention focuses on a pulse forming circuit 6, where its input is connected to an output (OUT) of the measured circuit 5 and its output is connected to an input (IN) of the measured circuit 5.

An input of a gate circuit 7 in a pulse forming circuit 6 is connected to the output (OUT) of the measured circuit 5. An output of the gate circuit 7 is connected to an input of the measured circuit 5.

By turning on the gate circuit 7 in the pulse forming circuit 6, an output of the measured circuit 7 is fed back to an input thereof on a digital signal level. When the entire feedback is logically inverted, the measured circuit 5 and the gate circuit 7 cause an oscillation, which is dependent upon the time difference between an input and an output of the measured circuit 5. An input/output delay of the measured circuit 5 can be obtained by measuring the oscillation frequency.

Also, when the phase after going through a feedback loop reverts to a normality, a pulse generating or forming circuit is provided at an output of the gate circuit 7 and a pulse to be supplied to the measured circuit is generated on commencing a measurement. The pulse generating circuit receives an output from the measured circuit again through the gate circuit, and the pulse generating circuit generates a pulse, again. Thus, as with the earlier description, a pulse can be constantly generated, and the repetition cycle of the pulse generation depends on the phase time difference, i.e. delay, of the measured circuit 5. The phase of the measured circuit 5 can be obtained by obtaining the oscillating frequency.

The measured circuit 5 can have a plurality of outputs instead of a single output. In this case, by setting a benchmark position and by obtaining the frequency difference from the benchmark, an internally provided phase adjusting circuit mutually adjusts output phases e.g. of a plurality of LSIs distributed in the measured circuit.

Figure 3:
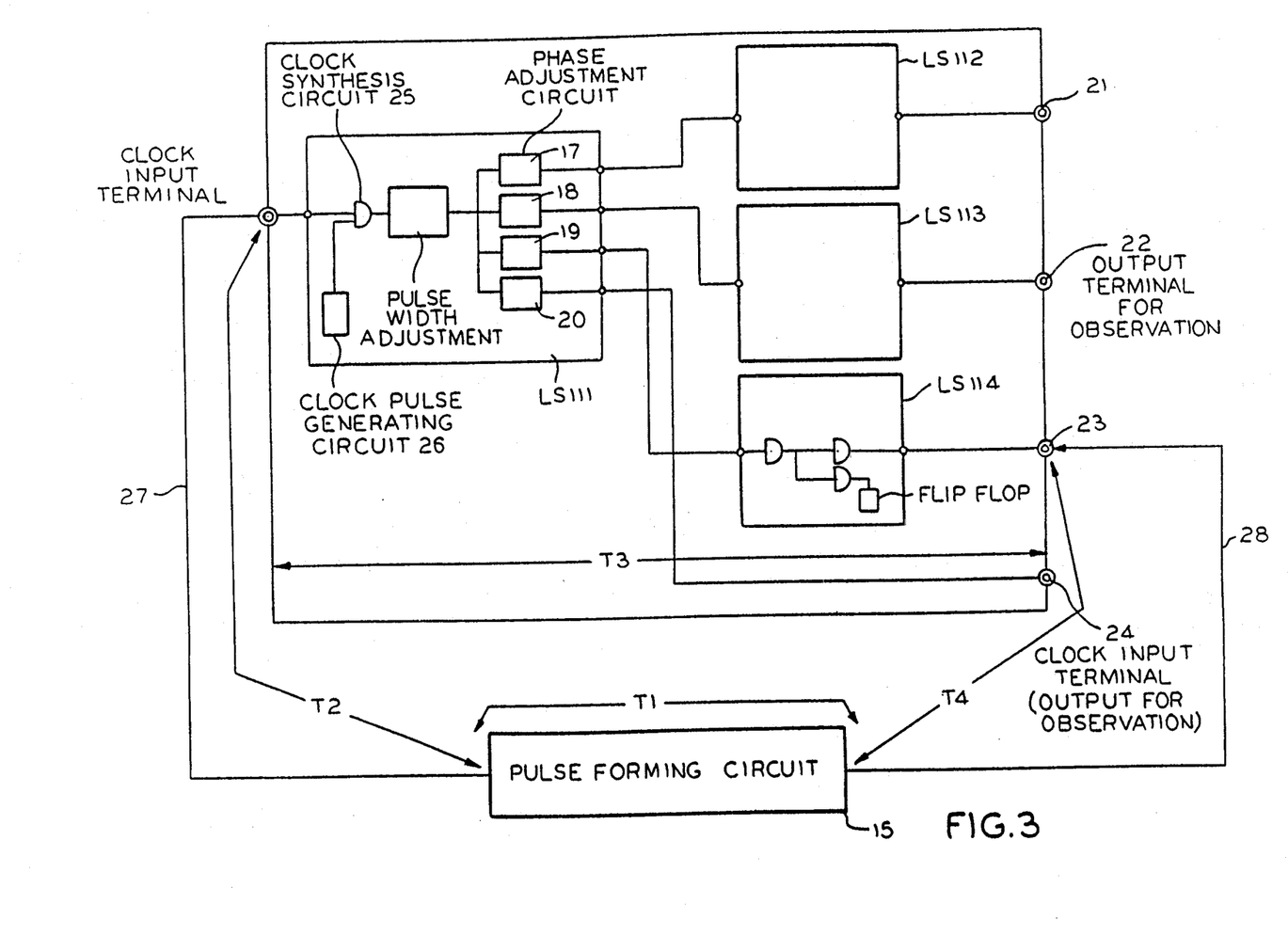
FIG. 3 is a block diagram of an embodiment of this invention.

FIG. 3 is a block diagram of an embodiment of this invention.

A printed circuit board 10 to be adjusted comprises four (4) LSIs 11 through 14. LSI 11 in the printed circuit board 10 to be adjusted comprises a clock pulse generating circuit 26 for generating a clock pulse. A pulse adjusting circuit 16 causes the clock pulse to have a predetermined pulse width. LSI 11 receives a clock signal from a pulse forming circuit 15 through an AND gate (clock synthesis circuit) 25 and a pulse width adjusting circuit 16, which is a circuit for generating a pulse width having a certain duration from a rise of an inputted clock and supplies a pulse signal having the certain pulse width to phase adjusting circuits 17 through 20. The pulse width adjusting circuit 16 comprises a variable delay circuit including an OR gate and a delay element and performs a chopping and expanding operation of a pulse. The phase adjusting circuits 17 through 20 are circuits for adjusting the phases to be supplied to LSIs 12, 13 and 14 so that the delays caused by LSIs 12,13 and 14 are, for example, canceled by the phase adjusting circuits 17 through 19, thereby providing the output signals with the same phase at the output terminals 21, 22, 23 and 24 for observation. LSIs 12, 13 and 14 receive outputs from the phase adjusting circuits 17, 18 and 19. LSIs 12, 13 and 14 output their internally generated signals respectively to output terminals for 21, 22 and 23 observation. LSIs 12, 13 and 14 have internal circuits (not shown) for performing logical operations on data e.g. inputted from a terminal and receive a common clock to cause respective operational controls to be performed by the same timing. Also, LSIs 12, 13 and 14 respectively have terminals for externally outputting the common clock and the results of the logical operations as outputs for observation.

That is, a clock output terminal 24, which is a circuit for obtaining the benchmark phase of the phase adjusting circuit, receives an output of the phase adjusting circuit 20.

The output terminals 21, 22 and 23 for observation are terminals for observing the phases of the clocks passed through LSIs 12, 13 and 14. Therefore, a pulse is generated through the pulse forming circuit 15, LSI 11 supplies the clock to LSIs 12, 13 and 14, and supplies the clock directly to the clock output terminal 24. The operation of the embodiment shown in FIG. 3 will be explained later by referring to FIG. 4.

Figure 4:
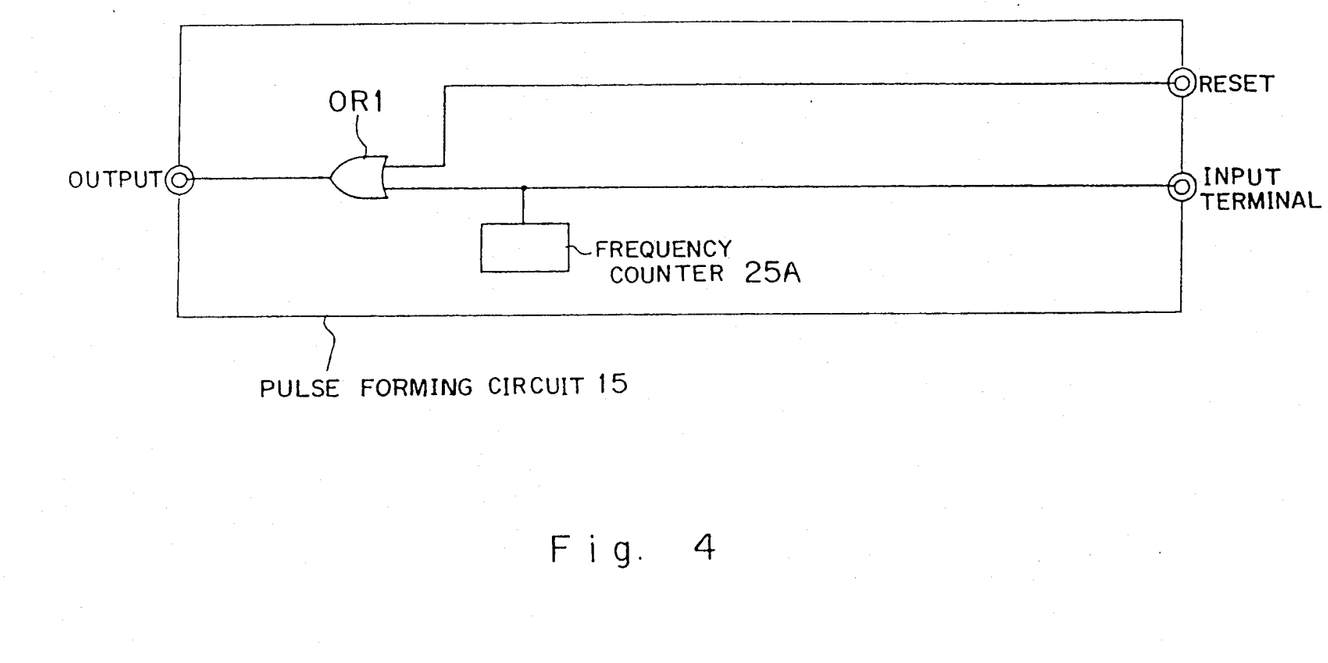
FIG. 4 is a block diagram of a first embodiment of a pulse forming circuit.

FIG. 4 is a block diagram of a first embodiment of the pulse forming circuit.

As is evident from FIG. 4, the pulse forming circuit 15 has an input terminal and a reset terminal. The input terminal, which is connected to a clock output terminal 24 and the output terminals 21, 22 and 23 for observation, does not let an inputted signal be outputted but instead outputs a signal at a predetermined level e.g. an H level, when the reset terminal receives a reset signal.

The embodiment shown in FIG. 4 comprises an OR gate OR1, which receives an H level signal and outputs an H level signal during a reset. During a measurement, i.e. during a clearance of a reset, the reset terminal receives an L level signal and LSI 11 receives an output from the OR gate as a clock input. LSI 11 in turn supplies the L level signal directly to the clock output terminal 24 or to the output terminals 21, 22 and 23 for observation through LSIs 12, 13 and 14.

For adjusting the benchmark phase, the clock output terminal 24 is connected to the input terminal illustrated in the block diagram of the first embodiment of the pulse forming circuit shown as FIG. 4, and the series of loops starts oscillation. A frequency counter 25A in the pulse forming circuit 15 obtains the oscillating frequency. The oscillation corresponds to the time difference from the clock input through LSI 11 to the clock output terminal 24. Therefore, obtaining the oscillating frequency enables the phase delay of LSI 11 to be obtained. That is, the benchmark phase without passing through LSIs 12, 13 and 14 is obtained.

When one (1) loop reverts to a normality, an oscillating frequency is expressed as T1+T2+T3+T4, where T1 is a delay of the pulse forming circuit 15, T2 is a delay of the line 27 connecting the pulse forming circuit 15 to the printed circuit board 10 to be adjusted, T3 is a delay between an input and an output in the printed circuit board 10 to be adjusted, and T4 is a delay of a line 28 connecting the printed circuit board 10 to be adjusted to the pulse forming circuit 15. Since delays T1, T2 and T4 can be measured beforehand, delay T3 can be obtained from the oscillating cycle or frequency.

When the delays of LSIs 12, 13 and 14 are measured, the input of the pulse forming circuit 15 is connected to the output terminals 21, 22 and 23 for observation. Whereas LSI does not have a time difference when the input from the pulse forming circuit 15 is supplied directly to terminal 24, a loop formed by LSIs 12, 13 and 14 causes a time difference when the input from the pulse forming circuit 15 is supplied to output terminals for observation 21, 22 and 23. That is, the oscillations in the latter case corresponds to the time delays caused respectively by LSIs 12, 13 and 14. By obtaining the oscillating frequency, respective time differences, i.e. delays, of LSIs 12, 13 and 14 can be obtained. An adjustment of phase adjusting circuits 17, 18 and 19 causes the printed circuit board 10 to be adjusted to have a consistent phase throughout and the pulses outputted to output terminals 21, 22 and 23 for observation to be outputted simultaneously.

Even when LSIs 12, 13 and 14 receive the clock pulse of the clock pulse generating circuit 26 respectively through phase adjusting circuits 17, 18 and 19, the loop starts similar oscillations regardless of whether the phase of the loop reverts to a normality or inverts to an abnormality.

Although the first embodiment of the phase adjusting circuit shown in FIG. 4 configures the pulse forming circuit 15 shown in FIG. 3 as described earlier, there could be similar variations.

Figure 5:
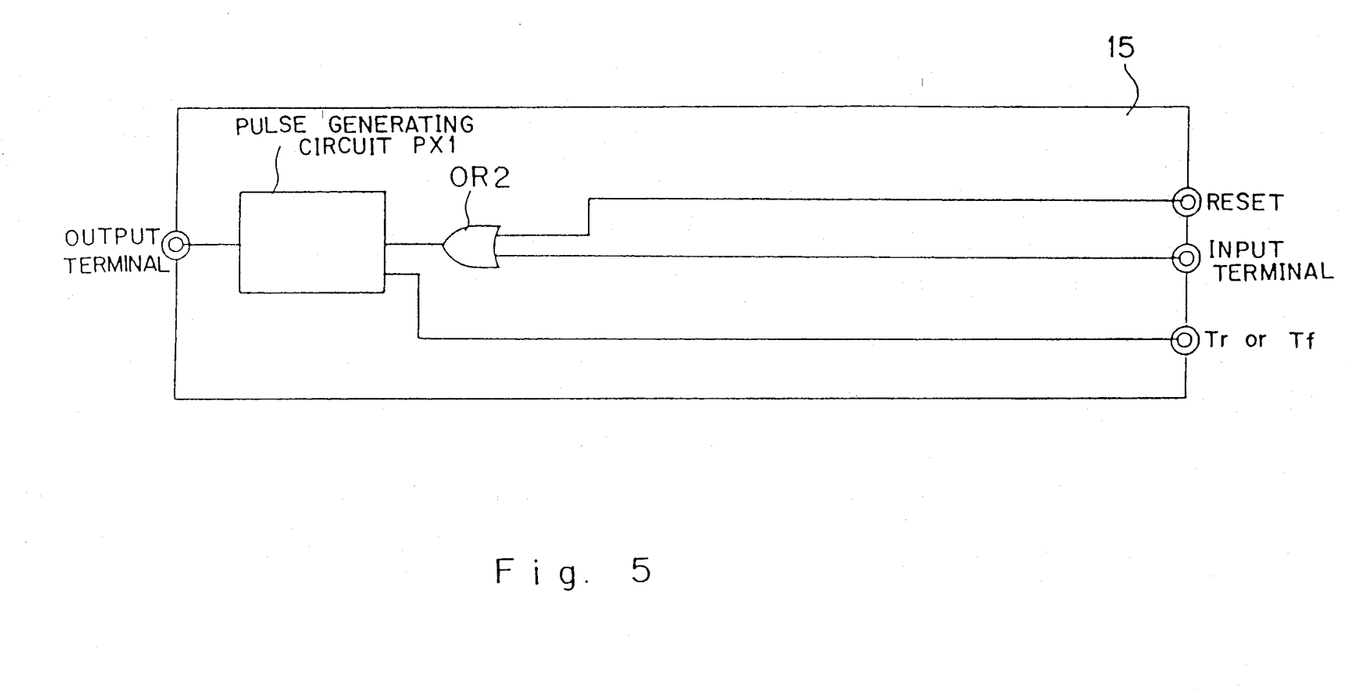
FIG. 5 is a block diagram of a second embodiment of the pulse forming circuit.

FIG. 5 is a block diagram of a second embodiment of pulse forming circuit.

The second embodiment of the pulse forming circuit comprises a pulse generating circuit PX1 provided at an output of an OR gate OR2 for generating a pulse having a predetermined pulse width in response to a rise $T_r$ or a fall $T_f$ of an external pulse. Here, the reset circuit and the input terminal are connected similarly to the configuration shown in FIG. 4. The second embodiment of the pulse forming circuit shown in FIG. 5 has a fixed level, when the printed circuit board 10 to be phase adjusted does not oscillate without using the internal clock pulse generating circuit 26, i.e. when the logic reverts to a normality after the clock passes through a loop. However, the second embodiment of the pulse forming circuit configuration shown in FIG. 5 causes the pulse generating circuit PX1 to generate a pulse supplied to the printed circuit board 10 to be adjusted. After passing through a circuit in the printed circuit board 10 to be phase adjusted shown in FIG. 3 described earlier, the pulse is again supplied to the input terminal and the pulse generating circuit PX1. This input causes a new pulse generation. A series of these repetitions cause sequential pulse generations. By obtaining the pulse generating frequency, the delays of LSIs 12, 13 and 14 can be measured similarly to the delay of LSI 11.

Figure 6:
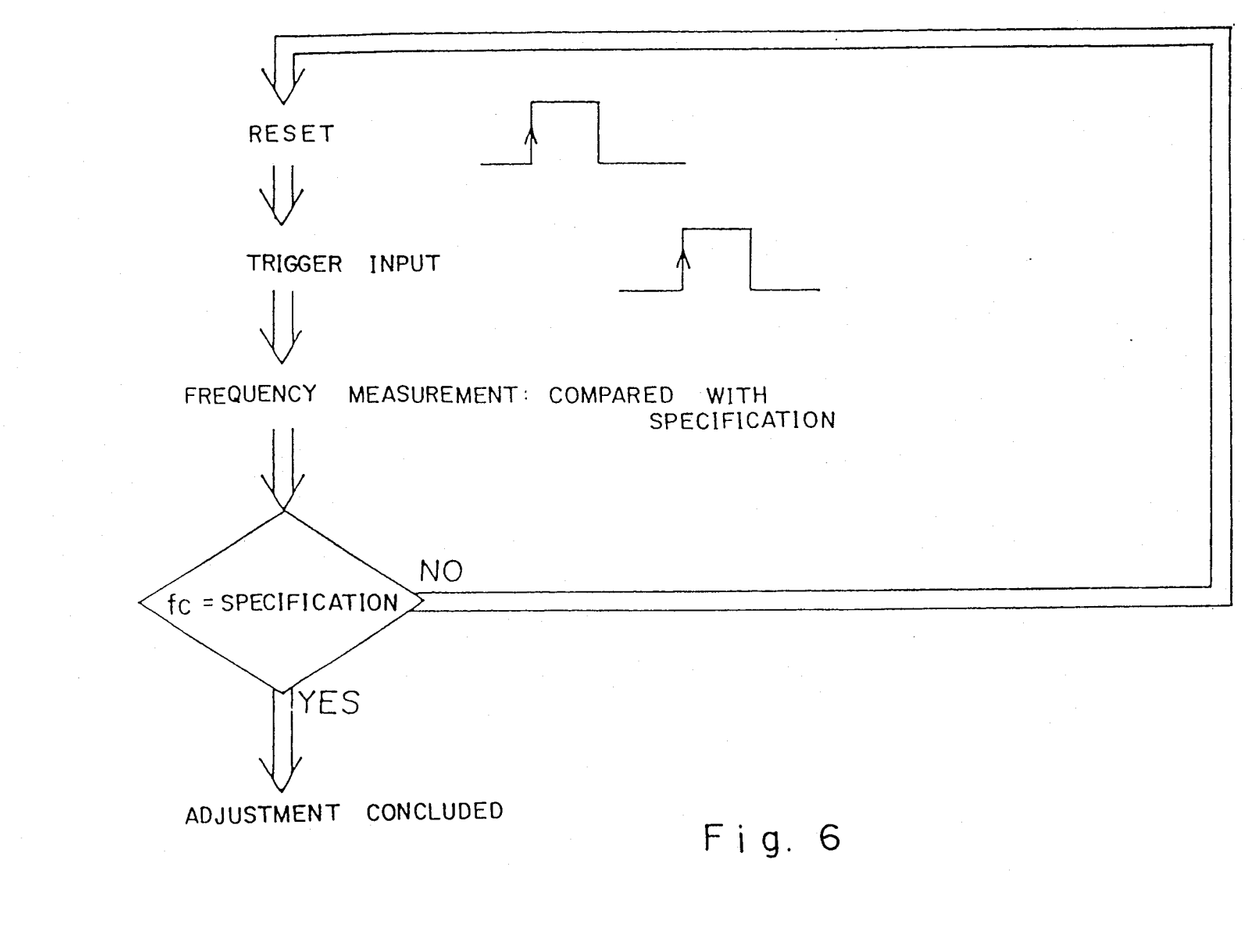
FIG. 6 is a flowchart illustrating the operations of the second phase embodiment of the adjusting circuit shown in FIG. 5.

FIG. 6 is a flowchart illustrating the operations of the second embodiment of the pulse forming circuit shown in FIG. 5.

When a loop is adjusted, a reset signal is applied first to reset the loop. That is, an High Level signal is supplied to an OR gate OR2, thereby blocking the entrance of a signal from an input into the pulse generating circuit PX1. Then, the reset is cleared and put back to an L level, before a triggering input is supplied. The triggering input causes the pulse generating circuit PX1 to generate the pulse. The pulse reverts to the input by the earlier described actions and causes the pulse generating circuit to generate a pulse. By measuring the repetition of the pulse generation, i.e. the frequency of the oscillation, a target delay can be observed for a comparison with a specification. When the target delay is not matched to the specification (NO), phase adjusting circuits 17, 18 and 19 are adjusted before performing another reset. When the target delay is matched to the specification (YES), the adjustment is completed.

Figure 7:
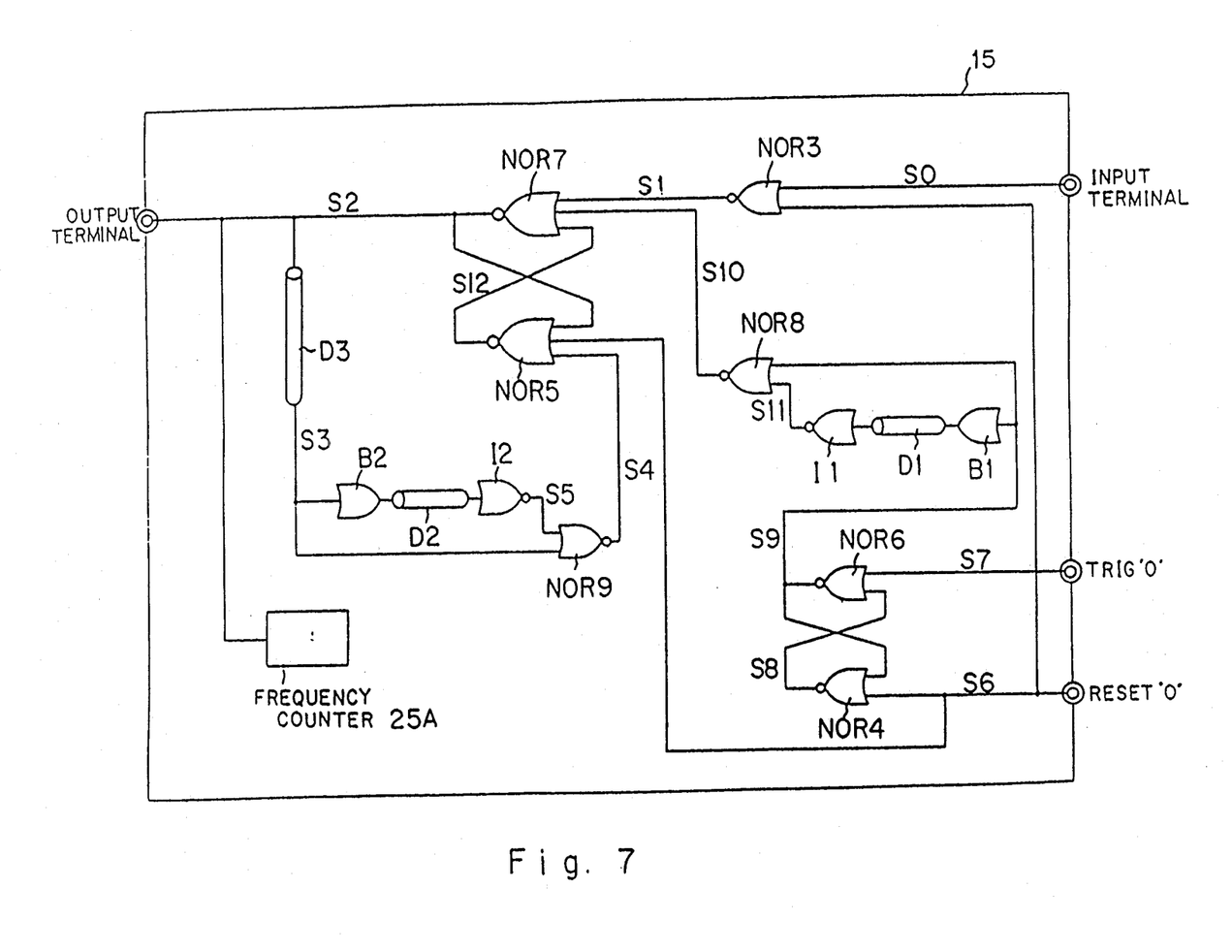
FIG. 7 is a block diagram of a third embodiment of the pulse forming circuit.

FIG. 7 is a block diagram of a third embodiment of the pulse forming circuit.

Figure 8:
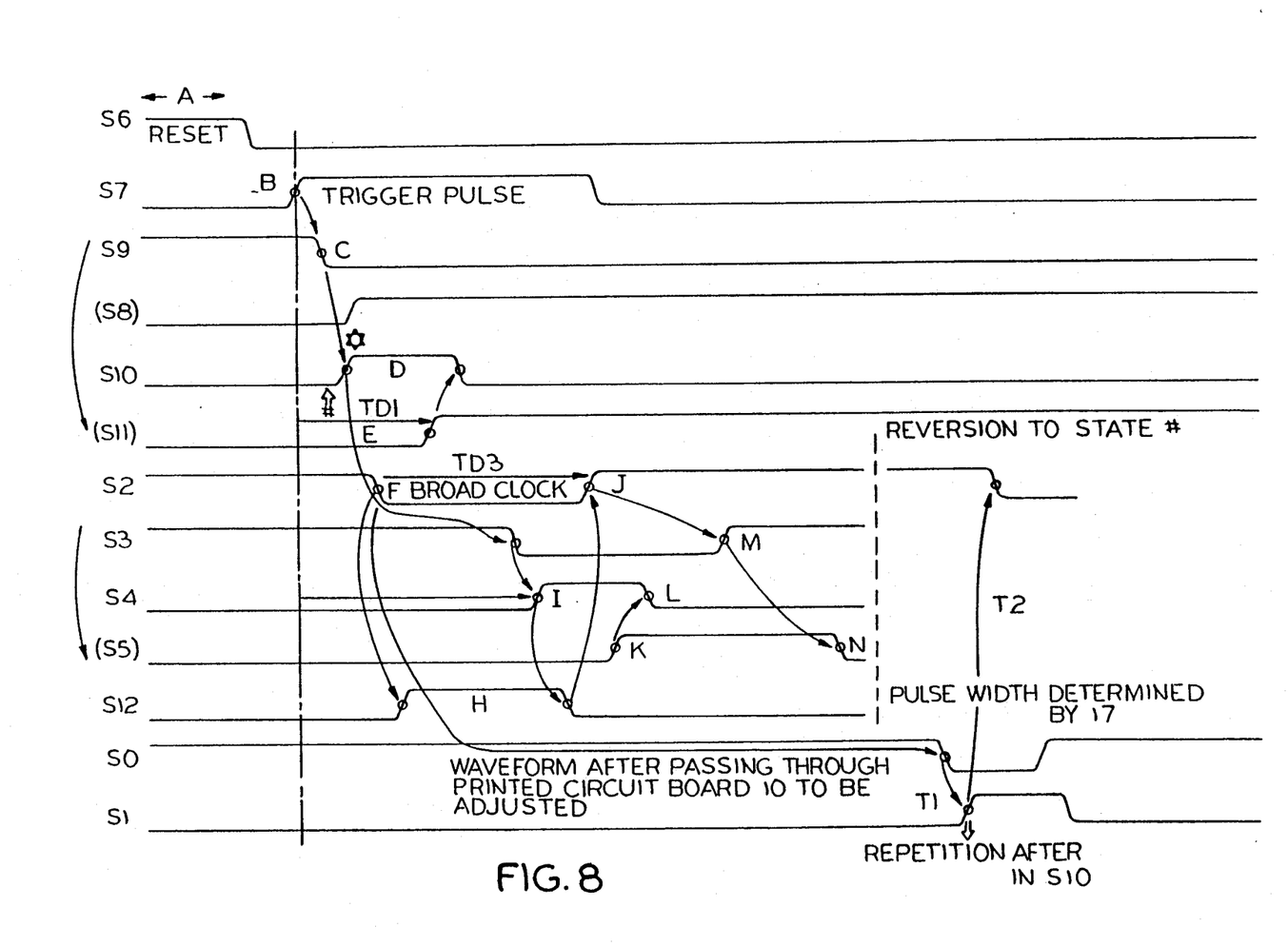
FIG. 8 is a timing chart of the third embodiment of the phase adjusting circuit shown in FIG. 7.

FIG. 8 is a timing chart of the third embodiment of the pulse forming circuit shown in FIG. 7. In the timing chart shown as FIG. 8, S0 is a signal supplied from an input terminal, S1 is an output from a NOR gate NOR3, S2 is an output from a NOR gate NOR7, S3 is an output from a delay line D3, S4 is an output from a NOR gate NOR9, S5 is an output from an inverter I2, S6 is a reset signal, S7 is a trigger signal, S8 is an output from a NOR gate NOR4, S9 is an output from a NOR gate NOR6, S10 is an output from NOR gate NOR8, S11 is an output from an inverter I1, and S12 is an output from a NOR gate NOR5.

The third embodiment of the pulse forming circuit comprises a delay line for generating a pulse having a target width. When the third embodiment of the pulse forming circuit is in a reset state (A in FIG. 8), since the reset signal (RESET) S6 is at an H level, NOR gates NOR3, NOR4 and NOR5 are turned off and their outputs S1, S8 and S12 are at an L level. NOR gates NOR4 and NOR5 respectively form RS flip-flops, paired with NOR gates NOR6 and NOR7. When the NOR gates NOR4 and NOR5 are ON to output an L level, outputs S9 and S2 from NOR gates NOR6 and NOR7 are at an H level.

When the third embodiment of the pulse forming circuit is in a reset state, since the trigger is 0, i.e. at an L level, NOR gate NOR6, one of which input is output S8 from a NOR gate NOR4, receives two L level signals when output S8 from NOR gate NOR4 is at an H level. A NOR gate NOR8 receives output S9 from NOR gate NOR6 through buffer B1, delay line D1, and inverter I1. Also, NOR gate NOR8 directly receives output S9 from a NOR gate NOR6.

At this time, whether a trigger signal TRIG is at an H level or at an L level, since one of the inputs to an OR gate NOR8 is at an H level, as long as NOR gate NOR8 does not change its output S10 (in a constant state), it outputs an L level signal. NOR gate NOR7 receives output S1 from NOR gate NOR3 in addition to an output from NOR gate NOR8. Here, the position of inverter I1 can be arranged interchangeably with that of buffer B1. Since NOR gate NOR5 also receives a reset signal (being at an H level when NOR gate NOR5 is reset), its output S1 is also at an L level. Because all signals supplied to NOR gate NOR7 (output S1 from NOR gates NOR3, output S12 from NOR5 and output S10 from NOR8) are at an L level, output S2 from NOR gate NOR7 is at an H level signal. Therefore, the printed circuit board 10 to be adjusted receives an H level signal.

Meanwhile, when the reset is cleared and the trigger signal TRIG is supplied (B in FIG. 8), NOR gate NOR6, forming an RS flip-flop together with NOR gate NOR4, temporarily receives an H level signal and output S9 from NOR gate NOR6 is at an L level (C in FIG. 8). The L level signal is supplied directly to NOR gate NOR8, and further after a certain period of time, i.e. after an elapse of a duration TD1, which is a delay caused by buffer B1, delay line D1 and inverter I1, the L level signal is inverted and supplied to NOR gate NOR8. NOR gate NOR8 receives L level signals at both terminals over the certain period of time, i.e. duration TD1, the delay caused by buffer B1, delay line D1 and inverter I1 (E in FIG. 8), and output S10 from NOR gate NOR8 is at an H level (D in FIG. 8) during the period.

That is, NOR gate NOR8, inverter I1, delay line D1 and buffer B1 described earlier form a differential circuit, which outputs a positive pulse only when output S9 from NOR gate NOR6 changes from an H level to an L level. NOR gate NOR7 receives the differential output, i.e. an H level pulse, which changes output S2 from NOR gate NOR7 to an L level (F in FIG. 8) and sets the RS flip-flop formed by NOR gates NOR7 and NOR5. Thus, the broad L level pulse with duration TD3 is produced until the RS flip-flop is reset.

That is, NOR gate NOR7 is turned off (outputs an L level signal) and the L level signal is supplied to the printed circuit board 10 to be adjusted shown in FIG. 3.

The differential circuit formed by buffer B2, delay line D2, inverter I2 and NOR gate NOR9 differentiates signal S3 which is obtained from output S2 from NOR gate NOR7 through delay line D3 (G in FIG. 8). After an elapse of a certain duration TD2, NOR gate NOR9 outputs an H level signal to NOR gate NOR5 (H in FIG. 8). That is, after an elapse of duration TD2 after a trigger signal TRIG is supplied, NOR gate NOR5 receives an H level signal. Although output S2 from NOR gate NOR7 is at an L level after receiving a trigger signal TRIG, since NOR gate NOR5 receives an H level signal (I in FIG. 8), output S2 from NOR gate NOR7 becomes an H level, after an elapse of a duration TD3 (J in FIG. 8). The printed circuit board 10 to be adjusted receives a pulse having the pulse width equal to the delay caused by a delay line D3, which is supplied to an input terminal after the intrinsic delay (T2 in FIG. 8) of the printed circuit board 10 to be adjusted, and further to NOR gate NOR7 through NOR gate NOR3 (T1 in FIG. 8). Signal S4 of an H level resets the RS flip-flop comprising NOR5 and NOR7 to provide its output with the high level. When the signal S5 becomes an H level (K in FIG. 8), the signal S4 becomes an L level (L in FIG. 8). When output S12 from NOR gate NOR5 changes to an L level, output S2 from NOR gate NOR7 changes to an H level (J in FIG. 8), output S3 from delay line D3 changes to an H level (M in FIG. 8), and output S5 from inverter I2 changes to an L level (N in FIG. 8).

The pulse forming circuit 15 ordinarily receives an H level input and supplies an H level output. When the pulse forming circuit 15 is cleared of a reset and receives a trigger signal TRIG, an L level pulse having a certain duration is outputted. Further, after an elapse of a certain period of time, the printed circuit board 10 to be adjusted inputs the L level pulse through NOR gate NOR3 to NOR gate NOR7. Thus, NOR gate NOR7 is again turned temporarily off, and the action similar to the one described earlier produces the same pulse, again. By measuring the frequency of the pulse repetition, the delay of the printed circuit board to be adjusted can be obtained. The third embodiment of the pulse forming circuit is effective, when all pulse widths need to be adjusted arbitrarily and the printed circuit board 10 to be adjusted must output a certain L level pulse.

Figure 9:
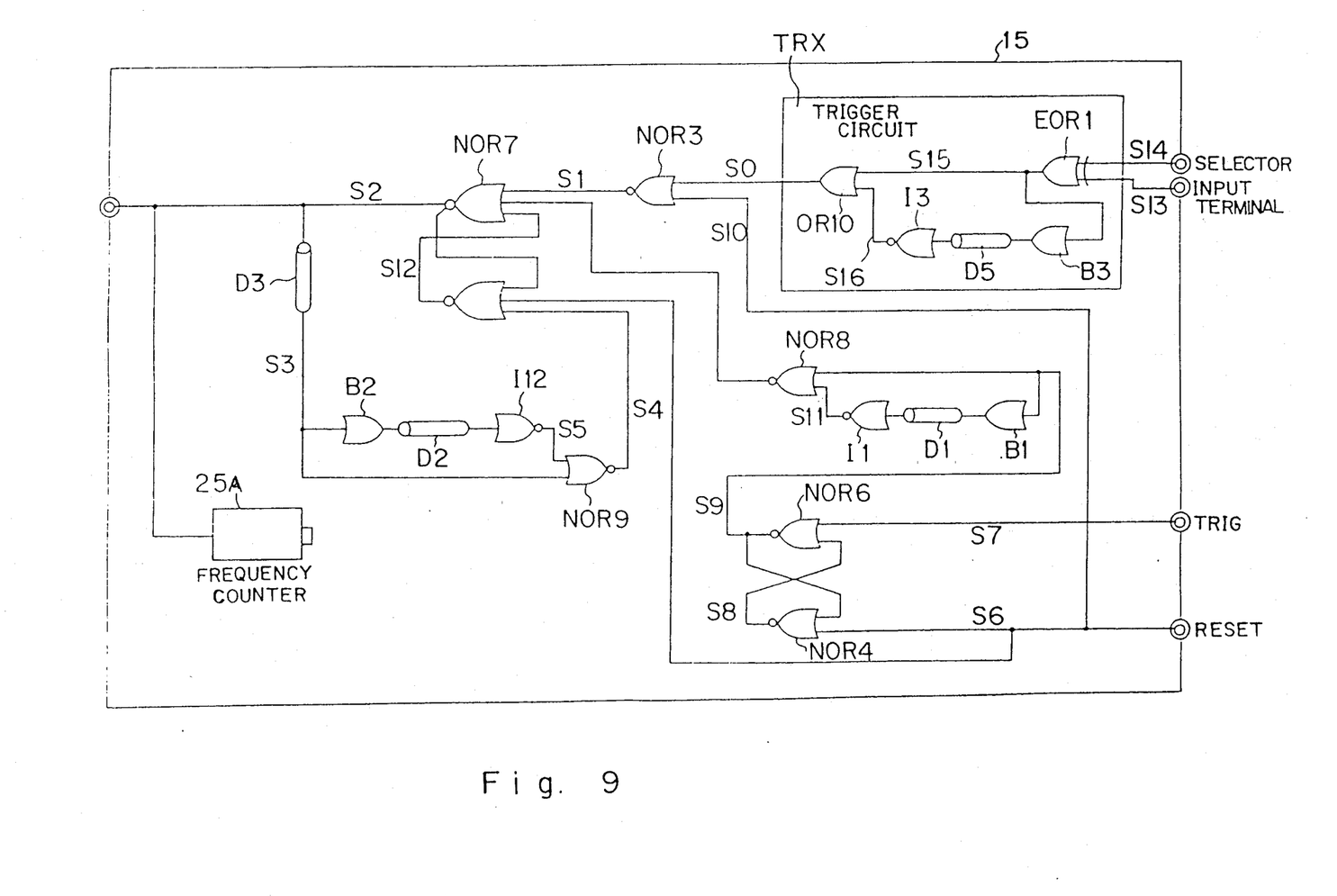
FIG. 9 is a block diagram of a fourth embodiment of the pulse forming circuit.
Figure 10:
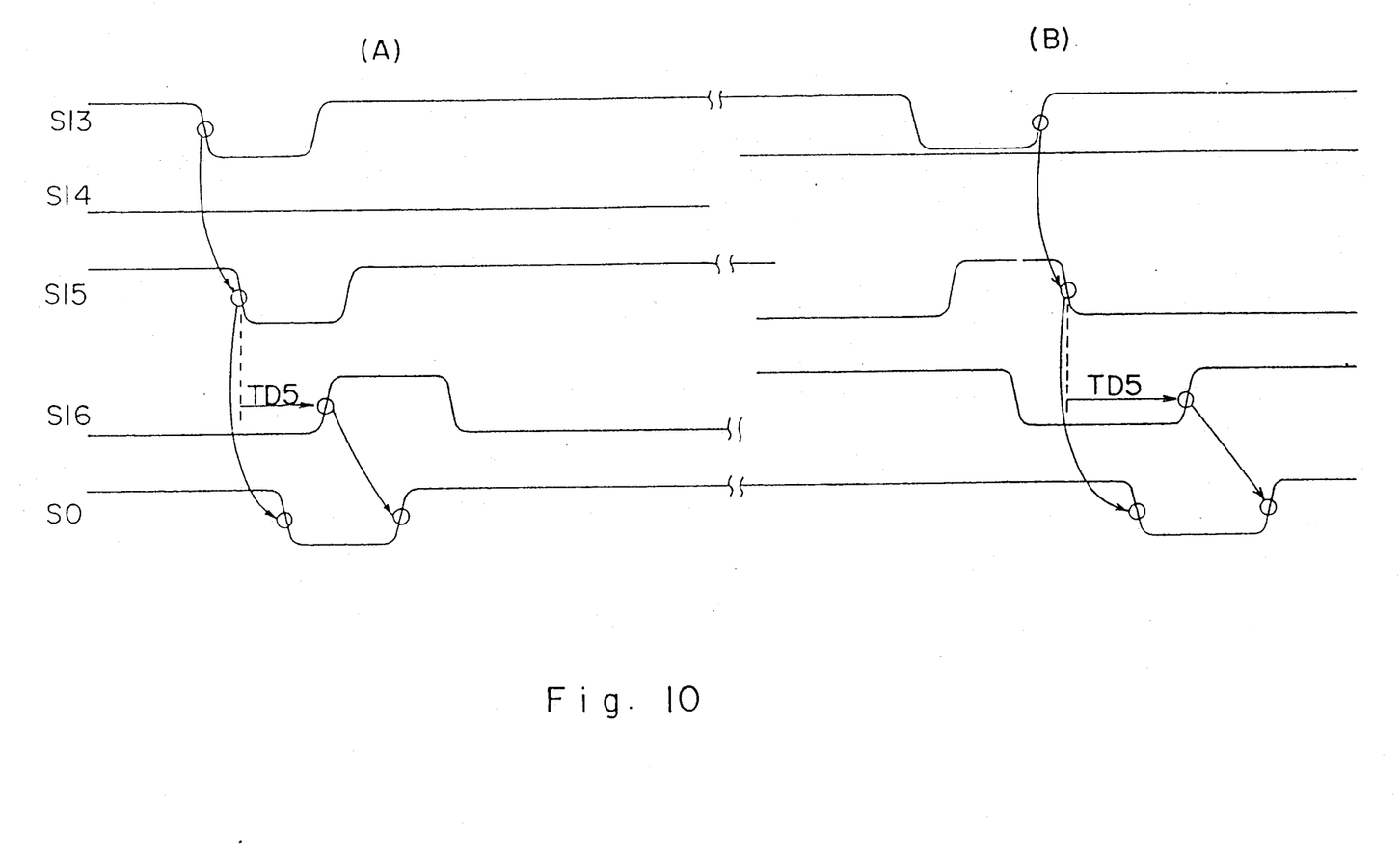
FIG. 10 is a timing chart of a trigger circuit.

FIG. 9 is a block diagram of a fourth embodiment of the pulse forming circuit, having a logic circuit for selecting an input and its logical inversion in addition to the configuration shown in FIG. 7. FIG. 10 is a timing chart of a trigger circuit.

The only difference of the configuration shown in FIG. 9 from that shown in FIG. 7 is that the former has a trigger circuit and an exclusive OR gate EOR1 between the input terminal and NOR gate NOR3. The same parts have the same numbers and their reexplanations are omitted.

In FIG. 9, a trigger circuit TRX has an exclusive OR gate EOR1 inserted between inputs. As shown in A in FIG. 10, when a selector signal S14 is at an L level, output S15 from the exclusive OR gate EOR1 is at an L level when EOR1 receives an L level input, and an H level signal on receiving an H level input. When an output from the selector is at an H level, as shown in B in FIG. 10, output S15 from the exclusive OR gate EOR1 is at an H level when EOR1 receives an L level input, and output S15 from the exclusive OR gate EOR1 is at an L level when it receives an H level.

An OR gate OR10 receives an output directly from the exclusive OR gate EOR1. The OR gate OR10 also receives an output from the exclusive OR gate EOR1 through buffer B3, delay line D5 and inverter I3. Here the position of buffer B3 can be rearranged interchangeably with the position of inverter I3.

Buffer B3, delay line D5, inverter I3 and OR gate OR10 in the trigger circuit form a differential circuit. When output S15 from the exclusive OR gate EOR1 changes from an H level to an L level, since an output from inverter I3 is at an L level, an output from the OR gate OR10 is at an L level.

After an elapse of a certain period of time, inverter I3 receives the L level output from the exclusive OR gate EOR1 through buffer B3 and delay line D5 and inverts the L level output to an H level input supplied to the other input terminal of the OR gate, thereby causing output SO from the OR gate OR10 to be at an H level.

Thus, the OR gate OR10 outputs an L level pulse corresponding to the certain duration TD5 defined by delay line D5.

If the selector outputs an L level signal, the OR gate OR10 outputs a pulse, when a signal supplied to the earlier described input terminal changes from an H level to an L level. However, if the selector signal is at an H level, the OR gate OR10 outputs a certain pulse, when a signal supplied to the earlier described input terminal changes from an L level to an H level.

This enables any logic to be phase adjusted, because the selector can change its output in correspondence with any logic inversion in the loop series, i.e. the printed circuit board 10 to be adjusted.

Furthermore, by counting respective frequencies of the selector signal having outputs "H" and "L", the fourth embodiment of the pulse forming circuit can adjust the pulse width by the difference between the delay when the selector output is "1" and the delay when the selector output is "0".

For instance, assume that the printed circuit board 10 to be adjusted has a non-inversion output. By having a selector output an H level signal, the fourth embodiment of the pulse forming circuit obtains a duration TUP between an input rise and an output rise from the oscillating frequency. By having a selector output an L level signal, the fourth embodiment of the pulse forming circuit obtains a duration TDN between an input rise and an output rise from the oscillating frequency. Duration TDN between an input rise and an output rise, when the selector outputs an L level signal, includes a duration TUP between an input rise and an output rise, when the selector outputs an H level signal. Subtraction of duration TUP from duration TDN enables the pulse width outputted from the circuit board 10 to be adjusted to be measured.

Embodiments of this invention have been described in detail above. Although these embodiments use delay lines for generating pulses having certain pulse widths, they can use a circuit such as a one-shot multiple vibrator instead.

Generally, a rise is important for a TTL and a fall is important for an ECL. This invention enables delays of such ICs to be measured. However, this invention is not limited to a TTL or an ECL, and can measure any delay between an input rise and an output rise of a printed circuit board or the like, as well as any delay between an input rise and an output fall thereof, no matter what logic the measured circuit 10 to be measured has.

Also, this invention enables the delay between an input fall and an output fall, as well as the delay between an input fall and an output rise, by inverting a pulse outputted from the pulse forming circuit 15.

As described above, this invention has an attached simple pulse forming circuit oscillate, a counter obtain the oscillating frequency, and delay time be measured, thereby enabling the delay of an LSI or a circuit board to be measured with high precision and at low cost. Since an assembled system does not require phase adjustment for respective signals, this invention simplifies factory maintenance.

What is claimed is:

1. A clock adjustment circuit for measuring a delay of a measured circuit comprising:

a pulse forming circuit for generating a clock pulse, a phase adjusting circuit supplied with said clock pulse at its input terminal, said phase adjusting circuit distributing said supplied clock pulse to a plurality of LSIs in a measured circuit and adjusting the phases of respective LSI clock pulses which are distributed to said LSIs;

a selected one of said LSIs operating in response to said distributed clock pulse supplied from said phase adjusting circuit, said LSI executing an operation by providing an output signal responsive to said distributed clock pulse;

trigger means for outputting a signal as a trigger out of a rise edge or a fall edge of a signal received from said selected LSI depending on whether or not an inverse logic of said clock pulse is generated when said LSI operation is executed;

feedback means for receiving said output signal from said trigger means, and supplying said output signal to an input terminal of said pulse forming circuit; and means for measuring the delay of said measured circuit receiving said distributed clock pulse by measuring an oscillation generated by said clock pulse generated by said pulse forming circuit, and said output signal of said trigger means.

2. A clock adjustment circuit comprising:

a pulse forming circuit; an output of said pulse forming circuit being connected to an input of a measured circuit, and an input of said pulse forming circuit being connected to an output of said measured circuit;

said pulse forming circuit comprising:

a gate circuit having an input which receives an output from said measured circuit; and a pulse generation circuit for receiving an output from said gate circuit at a first input of said pulse generation circuit, said pulse generation circuit generating a pulse of a predetermined width at a rise or a fall of a trigger signal received at a second input of said pulse generation circuit;

said pulse generation circuit further comprising:

a first differential circuit for differentiating said trigger signal, said trigger signal being supplied to an input of said first differential circuit;

a set-reset flip-flop set at least by an output from either said gate circuit or said first differential circuit, said output of said set-reset flip-flop being the output from said pulse generating circuit;

a first delay means responsive to said set-reset flip-flop output for generating an output which is delayed by a predetermined time from said set-reset flip-flop output; and a second differential circuit responsive to said output of said first delay means for differentiating an output from said first delay means and for resetting said set-reset flip-flop;

said pulse forming circuit further comprising a frequency counter responsive to said output of said measured circuit for measuring a delay in said measured circuit from a repetition cycle of an oscillation generated when said gate circuit is turned on.

3. The clock adjustment circuit according to claim 2, wherein said gate circuit further comprises a third differential circuit for differentiating a signal supplied from an output of said measured circuit.

4. The clock adjustment circuit according to claim 3, wherein said third differential circuit comprises:

a delay circuit for inverting an output from said measured circuit, said delay circuit also delaying said output from said measured circuit; and an OR gate receiving at its first input terminal an output from said delay circuit and at its second input terminal an output from said measured circuit, said OR gate providing said third differential circuit output.

5. The clock adjustment circuit according to claim 2, wherein said first differential circuit comprises:

a delay circuit for inverting said trigger signal, said delay circuit also delaying said trigger signal; and a NOR gate receiving at its first input terminal an output from said delay circuit and at its second input terminal said trigger signal, said NOR gate providing said differential circuit output.

6. The clock adjustment circuit according to claim 3, wherein said third differential circuit comprises at its input terminal an exclusive OR gate, said exclusive OR gate receiving at one of its input terminals a selection signal which is selectively high or low, depending on the logic inversion of the measured circuit.

7. The clock adjustment circuit according to claim 6, wherein said selection signal causes said third differential circuit to obtain (a) a first delay between rise of a pulse provided to said input of said measured circuit and rise of an output pulse of said measured circuit, said output pulse supplying a high level signal to one input terminal of said exclusive OR gate, or (b) a second delay between a rise of said pulse provided to said input of said measured circuit and a fall of said output pulse of said measured circuit, by supplying a low level signal to said one input terminal of said exclusive OR gate.

8. The clock adjustment circuit according to claim 7, wherein said third differential circuit comprises means for obtaining the width of an output pulse of said measured circuit based on the difference between said second delay and said first delay.

* * * * *

UNITED STATES PATENT AND TRADEMARK OFFICE
CERTIFICATE OF CORRECTION

PATENT NO. : 5,329,240
DATED : July 12, 1994
INVENTOR(S) : Katsuhisa Kubota, Kunitoshi Yamamoto, Kazuharu Nakano It is certified that error appears in the above-indentified patent and that said Letters Patent is hereby corrected as shown below:

Column 5, line 55, delete "NORS" and insert --NOR3--.

Column 5, line 56, delete "NORS" and insert --NOR3--.

Signed and Sealed this

Eleventh Day of July, 1995

Attest:

BRUCE LEHMAN

*Attesting Officer*     *Commissioner of Patents and Trademarks*